(12) United States Patent
SangChul et al.

(10) Patent No.: US 7,535,540 B2
(45) Date of Patent: May 19, 2009

(54) LIQUID CRYSTAL DISPLAY DEVICE AND METHOD OF MANUFACTURING THE SAME

(75) Inventors: Ryu SangChul, Gumi-si (KR); Kim JongHee, Gumi-si (KR); Jung SangChul, Daegu (KR); Yoo Kitaek, Wonju-si (KR); Park SangHuck, Busan (KR)

(73) Assignee: LG Display Co., Ltd., Seoul (KR)

( * ) Notice: Subject to any disclaimer, the term of this patent is extended or adjusted under 35 U.S.C. 154(b) by 324 days.

(21) Appl. No.: 11/315,156

(22) Filed: Dec. 23, 2005

(65) Prior Publication Data

US 2007/0002259 A1   Jan. 4, 2007

(30) Foreign Application Priority Data

Jun. 29, 2005 (KR) .................... 10-2005-0057264

(51) Int. Cl.
 *G02F 1/1339* (2006.01)
 *G02F 1/13* (2006.01)
(52) U.S. Cl. .................. 349/155; 349/156; 349/187
(58) Field of Classification Search ............. 349/155, 349/156, 142, 187, 189, 181, 193, 196, 197, 349/123, 126, 113
 See application file for complete search history.

(56) References Cited

U.S. PATENT DOCUMENTS 6,577,374 B1 * 6/2003 Nakata et al. ............ 349/156
7,023,514 B2 * 4/2006 Shin et al. ................ 349/138
2003/0122989 A1 * 7/2003 Park et al. ................. 349/43
2004/0007752 A1 * 1/2004 Nakata et al. ............. 257/443
2004/0041970 A1 * 3/2004 Lee et al. ................. 349/141
2007/0002259 A1 * 1/2007 SangChul et al. .......... 349/155
2007/0002260 A1 * 1/2007 Choi ........................ 349/155
2007/0132936 A1 * 6/2007 Lee et al. ................. 349/156

FOREIGN PATENT DOCUMENTS

KR   1020040059001   7/2004

* cited by examiner

*Primary Examiner*—Brian M Healy
(74) *Attorney, Agent, or Firm*—McKenna Long & Aldridge LLP

(57) ABSTRACT

Provided is an LCD that can be manufactured by a simplified process. The LCD includes first and second substrates, and a liquid crystal layer interposed between the first and second substrates. TFTs are formed in a pixel region defined on the first substrate. A photosensitive material is coated on each of the TFTs, and light is irradiated by a photo mask including a full open region, a half open region and a closed region. Accordingly, the photosensitive material is removed from the pixel region, and a passivation layer and a spacer are simultaneously formed on each of the TFTs. A transparent conductive pattern is formed on the spacer together with a pixel electrode formed in the pixel region, and is electrically connected to a common electrode of the second substrate.

22 Claims, 4 Drawing Sheets

LIQUID CRYSTAL DISPLAY DEVICE AND METHOD OF MANUFACTURING THE SAME

This application claims the benefit of Korean Patent Application No. 2005-057264, filed Jun. 29, 2005, which is incorporated by reference for all purposes as if fully set forth herein.

BACKGROUND OF THE INVENTION

1. Field of the Invention

The present invention relates to a liquid crystal display device (LCD), and more particularly, to an LCD that can be manufactured by a simplified process and a method of manufacturing the same.

2. Description of the Related Art

A liquid crystal display device (LCD) is considered as the next generation display device because it has good portability and low power consumption and is also technology-intensive and high value-added.

The LCD includes a liquid crystal panel having two glass (or plastic) substrates between which liquid crystal is filled. A transparent electrode (e.g., common electrode and pixel electrode) is formed on each of the substrates to apply a given voltage to the filled liquid crystal. The light transmittance of the liquid crystal panel is controlled by a voltage applied to the transparent electrode, and characters/images are displayed by a light shutter effect.

An active matrix type LCD including a switching device for driving each pixel is most widely used because of its excellent resolution and performance in displaying a moving image.

In general, a method of manufacturing the liquid crystal panel includes an array substrate fabrication process for forming switching devices and pixel electrodes, a color filter substrate fabrication process for forming a color filer and a common electrode, and a liquid crystal cell process for interposing liquid crystal between the two substrates.

When compared to the array substrate fabrication process and the color filter substrate fabrication process, the liquid crystal cell process requires few or no repeated operations. The liquid crystal cell process can be broadly divided into an alignment layer forming operation for alignment of liquid crystal molecules, a cell gap forming operation, a cell cutting operation, and a liquid crystal injecting operation.

FIG. 1 is a sectional view of a related art LCD.

Referring to FIG. 1, the LCD includes an array substrate 30 and a color filter substrate 10 that are spaced apart from each other by a predetermined distance, and a liquid crystal layer 50 interposed between the array substrate 30 and the color filter substrate 10.

The array substrate 30 includes a transparent substrate 1, a gate electrode 32 formed on the transparent substrate 1, a gate insulation layer 34 formed on the transparent substrate 1 including the gate electrode 32, a semiconductor layer 36 including an active layer 36a and an ohmic contact layer 36b sequentially formed on the gate insulation layer 34 corresponding to the gate electrode 32, and source/drain electrodes 38 and 40 formed on the semiconductor layer 36 and spaced apart from each other by a predetermined distance. The gate electrode 32, the semiconductor layer 36, and source/drain electrodes 38 and 40 constitute a thin film transistor (TFT) T.

Although not illustrated in FIG. 1, a gate line connected to the gate electrode 32 is formed in a first direction, and a data line connected to the source electrode 38 is formed in a second direction crossing the first direction. A region where the gate and data lines cross each other is defined as a pixel region P.

A passivation layer 42 with a drain contact hole 44 is formed on the TFT T, and a pixel electrode 48 electrically connected to the drain electrode 40 by the drain contact hole 44 is formed in the pixel region P.

The color filter substrate 10 includes a transparent substrate 5, a color filter layer 14 formed on the transparent substrate 5 at a position corresponding to the pixel electrode 48 to transmit light of a specific wavelength, and a black matrix 12 formed at an interface between the transparent substrate 5 and the color filter layer 14 to block light leakage and light flow into the TFT T.

A common electrode 16 for applying a voltage to the liquid crystal layer 50 is formed on the color filter layer 14 and the black matrix 12.

For prevention of leakage of the liquid crystal layer 50, the edges of the array substrate 30 and the color filter layer 10 are sealed with a seal pattern 52.

A ball spacer 54 is disposed at a predetermined region between the array substrate 30 and the color filter substrate 10 to maintain a cell gap therebetween.

The ball spacer 54 is formed of organic material or glass fiber with elasticity against an external pressure. The ball spacers 54 are randomly dispersed on the substrates 10 and 30, and thus have the following problems.

First, the possible movement of the ball spacers may cause defects in the alignment layer.

Secondly, the absorptive power between the ball spacer and a neighboring liquid crystal molecules may cause light leakage around the ball spacer.

Thirdly, in a case of a wide-screen LCD, it is difficult to maintain a stable cell gap.

Fourthly, the ball spacer is elastic and movable and thus may case a ripple phenomenon when a screen is touched.

Consequently, it is difficult to obtain a high quality image in the LCD whose cell gap is maintained using the ball spacers.

To solve these problems, there is proposed a method of forming a spacer pattern (i.e., a patterned spacer) at a predetermined position by photolithography.

The patterned spacer is fixed to a non-pixel region of the LCD. Therefore, the use of the patterned spacer makes it possible to easily maintain the cell gap, prevent the light leakage, precisely control the cell gap for an LCD requiring a small cell gap, enhance the solidity of the LCD, and prevent the ripple phenomenon from occurring when the screen is touched.

FIG. 2 is a sectional view of a related art LCD including patterned spacers.

Referring to FIG. 2, the LCD includes an array substrate 70 and a color filter substrate 60 that are disposed to face each other. A TFT T and a pixel electrode 72 of transparent conductive material connected to the TFT T are formed on the array substrate 70. A black matrix 62 is formed on the color filter substrate 60 at a position corresponding to the TFT T, a color filter 64 is formed on the black matrix 62 at a position corresponding to the pixel electrode 72, and a common electrode 66 is formed on the color filter 64.

A patterned spacer 74 is formed between the black matrix 62 and the TFT T to maintain a uniform cell gap between the array substrate 70 and the color filter substrate 60.

A liquid crystal layer 80 is interposed between the array substrate 70 and the color filter substrate 60.

In the related art, the patterned spacer is formed on one of the substrates 70 and 60 and then the substrates 70 and 60 are attached together, thereby maintaining a uniform cell gap between the substrate 70 and 60.

However, the patterned spacer 74 must be formed by a separate mask process. This causes an increase in the complexity and cost of the entire manufacturing process.

SUMMARY OF THE INVENTION

Accordingly, the present invention is directed to an LCD and a method of manufacturing the same that substantially obviates one or more problems due to limitations and disadvantages of the related art.

An advantage of the present invention is to provide an LCD having a passivation layer with a spacer and a method of manufacturing the LCD.

Another advantage of the present invention is to provide an LCD where conductive material on a spacer can be used instead of Ag dots and a method of manufacturing the LCD.

Additional advantages and features of the invention will be set forth in part in the description which follows and in part will become apparent from the description, or may be learned by practice of the invention. The advantages of the invention will be realized and attained by the structure particularly pointed out in the written description and claims hereof as well as the appended drawings.

To achieve these and other advantages and in accordance with the purpose of the invention, as embodied and broadly described herein, there is provided an LCD device comprising: first and second substrates facing each other and including a plurality of pixel regions arranged in a matrix; a liquid crystal layer interposed between the first and second substrates; a plurality of TFTs formed on the pixel regions on the first substrate; a passivation layer formed on the TFTs; and a spacer integrally formed with the passivation layer.

In another aspect of the present invention, there is provided a method of manufacturing a LCD device, comprising: forming a plurality of TFTs in each pixel region on a first substrate where a plurality of the pixel regions arranged in a matrix are defined; simultaneously forming a spacer and a passivation layer on the TFT; preparing a second substrate facing the first substrate and including a color filter layer and a common electrode; and interposing a liquid crystal layer between the first substrate and the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
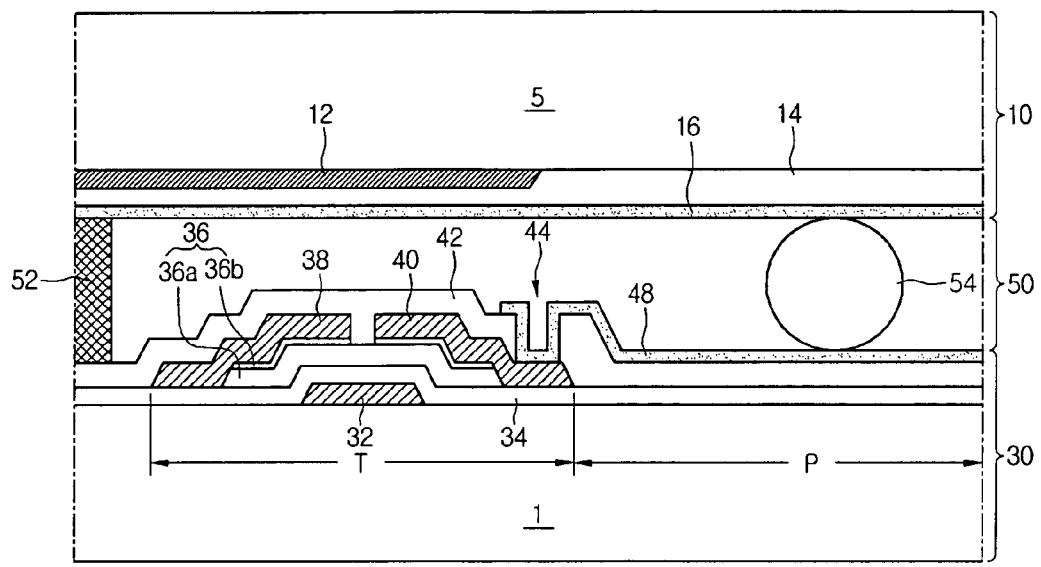
FIG. 1 is a sectional view of a related art LCD.
Figure 2:
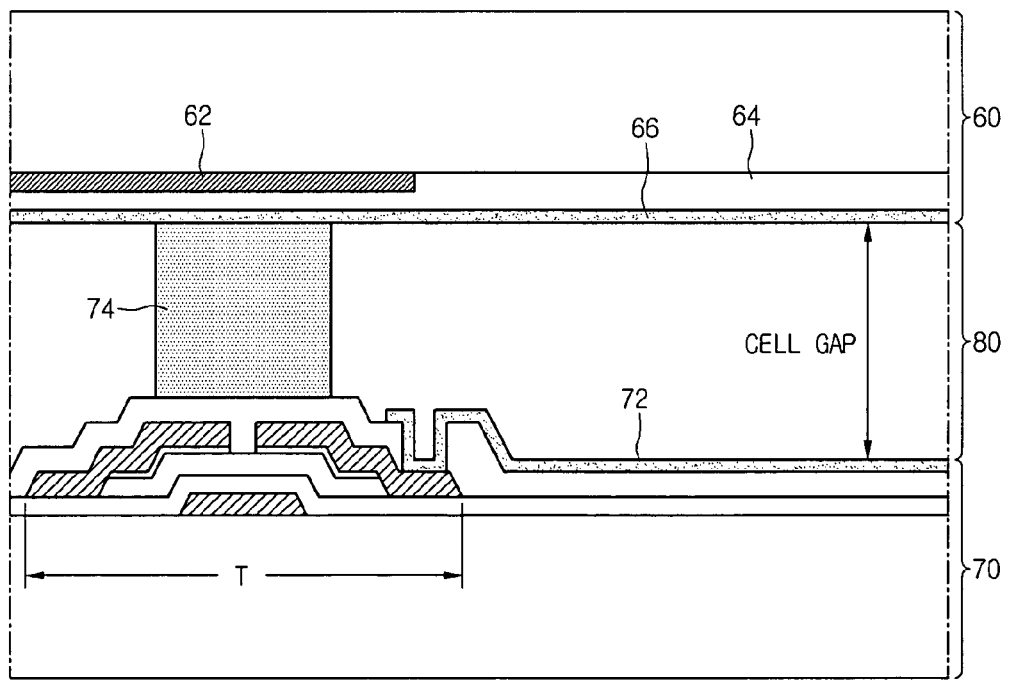
FIG. 2 is a sectional view of a related art LCD including patterned spacers.
Figure 3:
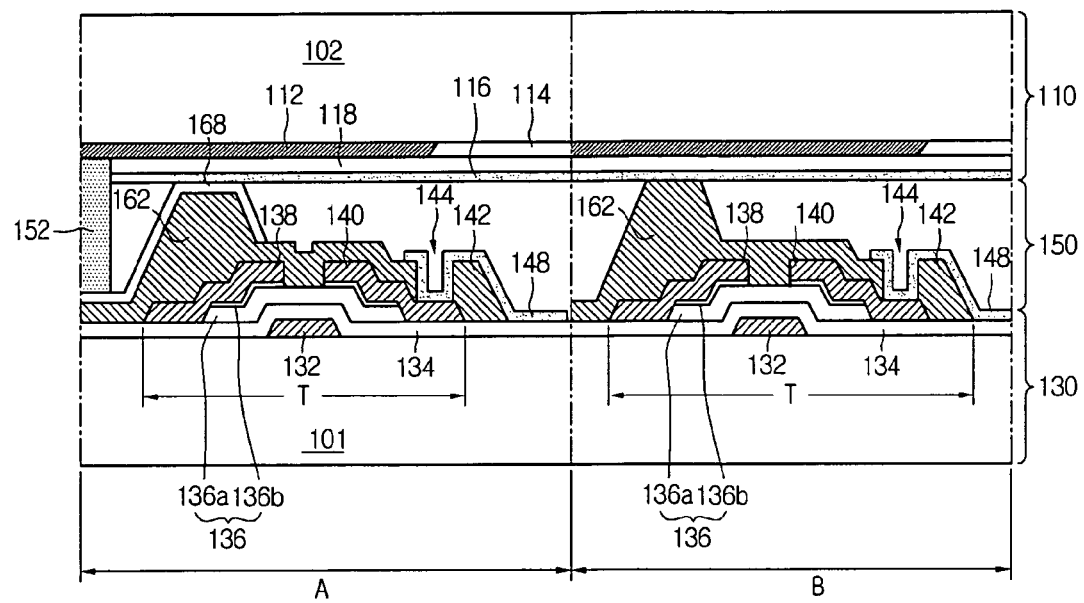
FIG. 3 is a sectional view of an LCD according to an embodiment of the present invention.

FIG. 3 is a sectional view of an LCD according to an embodiment of the present invention.

Specifically, FIG. 3 illustrates a peripheral pixel A and a central pixel B in a display region of the LCD.

Referring to FIG. 3, the LCD includes an array substrate 130 and a color filter substrate 110 that are disposed to face each other, and a liquid crystal layer 150 interposed between the array substrate 130 and the color filter substrate 110.

The array substrate 130 includes a transparent substrate 101, a gate electrode 132 formed on the transparent substrate 101, a gate insulation layer 134 formed on the transparent substrate 101 including the gate electrode 132, a semiconductor layer 136 including an active layer 136a and an ohmic contact layer 136b sequentially formed on the gate insulation layer 134 corresponding to the gate electrode 132, and source/drain electrodes 138 and 140 formed on the semiconductor layer 136 and spaced apart from each other by a predetermined distance. The gate electrode 132, the semiconductor layer 136, and source/drain electrodes 138 and 140 constitute a thin film transistor (TFT) T.

Although not illustrated in FIG. 3, a gate line connected to the gate electrode 132 is formed in a first direction, and a data line connected to the source electrode 138 is formed in a second direction crossing the first direction. A region where the gate and data lines cross each other is defined as a pixel region.

A passivation layer 142 with a drain contact hole 144 is formed on the TFT T, and a pixel electrode 148 electrically connected to the drain electrode 140 by the drain contact hole 144 is formed in the pixel region.

The passivation layer 142 is formed at a position corresponding to the TFT T and the data line, but is not formed in the pixel region.

The passivation layer 142 is formed in one piece with a spacer 162, and a transparent conductive pattern 168 of the same material as the pixel electrode 148 is formed on the spacer 162 formed in a portion of the peripheral pixel A. The spacer 162 is formed in plurality. The spacer 162 may be a patterned spacer.

The transparent conductive pattern 168 is formed to extend to the peripheral portion via the bottom surface of a seal pattern 152.

The color filter substrate 110 includes a transparent substrate 102, a black matrix 112 formed on the substrate 102 in an region corresponding to the TFT T, a color filter layer 114 formed on the substrate 102 in a region corresponding to the pixel electrode 148, an overcoat layer 118 formed on the color filter 114, and a common electrode 116 formed on the overcoat layer 118 and formed of the same material as the pixel electrode 148.

A seal pattern 152 for attaching the array substrate 130 and the color filter substrate 110 together is formed around the display region.

The spacer 162 formed in one piece with the passivation layer 142 serves to maintain a uniform cell gap between the array substrate 130 and the color filter substrate 110, and is formed in a region between the black matrix and the TFT T.

Although not illustrated in FIG. 3, an alignment layer for aligning liquid crystal molecules is formed on an interface between the liquid crystal layer 150 and each of the substrates 110 and 130.

The transparent conductive pattern 168 formed on the spacer 162 in the peripheral pixel A is electrically connected to the common electrode 116. The transparent conductive pattern 168 extending to the peripheral portion via the bottom surface of the seal pattern 152 is connected to a common voltage generator (not illustrated).

Accordingly, a common voltage is applied to the common electrode 116 through the transparent conductive pattern 168 formed on the spacer 162.

As described above, the passivation layer 142 and the spacer 162 are formed in one piece and are simultaneously formed of photosensitive material using one diffraction mask without using an addition mask process, thereby making it possible to reduce the complexity and cost of the entire manufacturing process.

FIGS. 4A through 4E are sequential sectional views illustrating a process of manufacturing an LCD according to an embodiment of the present invention.

Figure 4A:
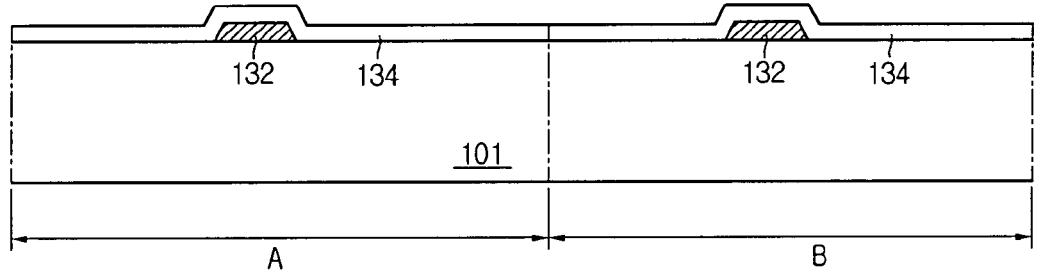
FIGS. 4A through 4E are sequential sectional views illustrating a process of manufacturing an LCD according to an embodiment of the present invention.

Referring to FIG. 4A, a metallic material is deposited on a substrate 101 and the resulting structure is patterned to form a gate line (not illustrated) and a gate electrode 132.

An organic insulation material selected from the group consisting of a silicon nitride ($SiN_x$) and a silicon oxide ($SiO2$) is deposited on the substrate 101 including the gate electrode 132 to form a gate insulation layer 134.

Figure 4B:
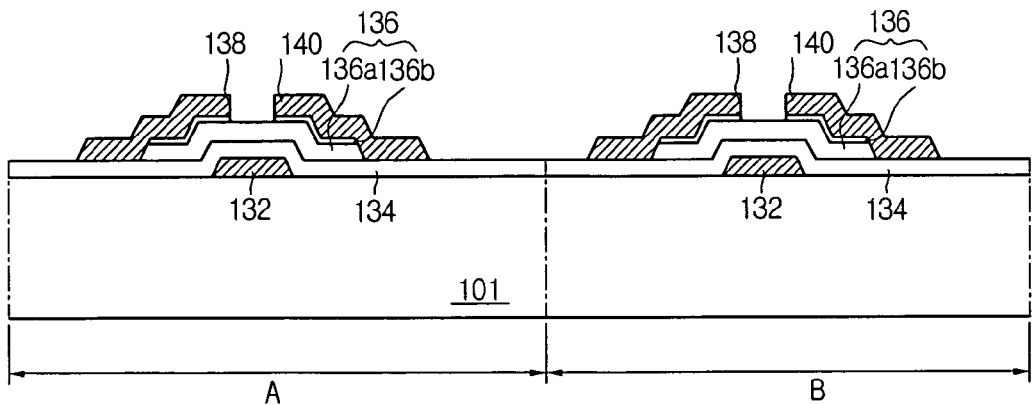

Referring to FIG. 4B, amorphous silicon and impurity-containing amorphous silicon are sequentially deposited on the substrate 101 including the gate insulation layer 134 and then the resulting structure is patterned by photolithography to form an active layer 136a and an ohmic contact layer 136b in an island shape. The active layer 136a and the ohmic contact layer 136b constitute a semiconductor layer 136.

Thereafter, a metallic material is deposited on the substrate 101 including the semiconductor layer 136, and the resulting structure is patterned to form a data line (not illustrated) crossing the gate line and source/drain electrodes 138 and 140 spaced apart from each other by a predetermined distance on the substrate 101 corresponding to the gate electrode 132.

Figure 4C:
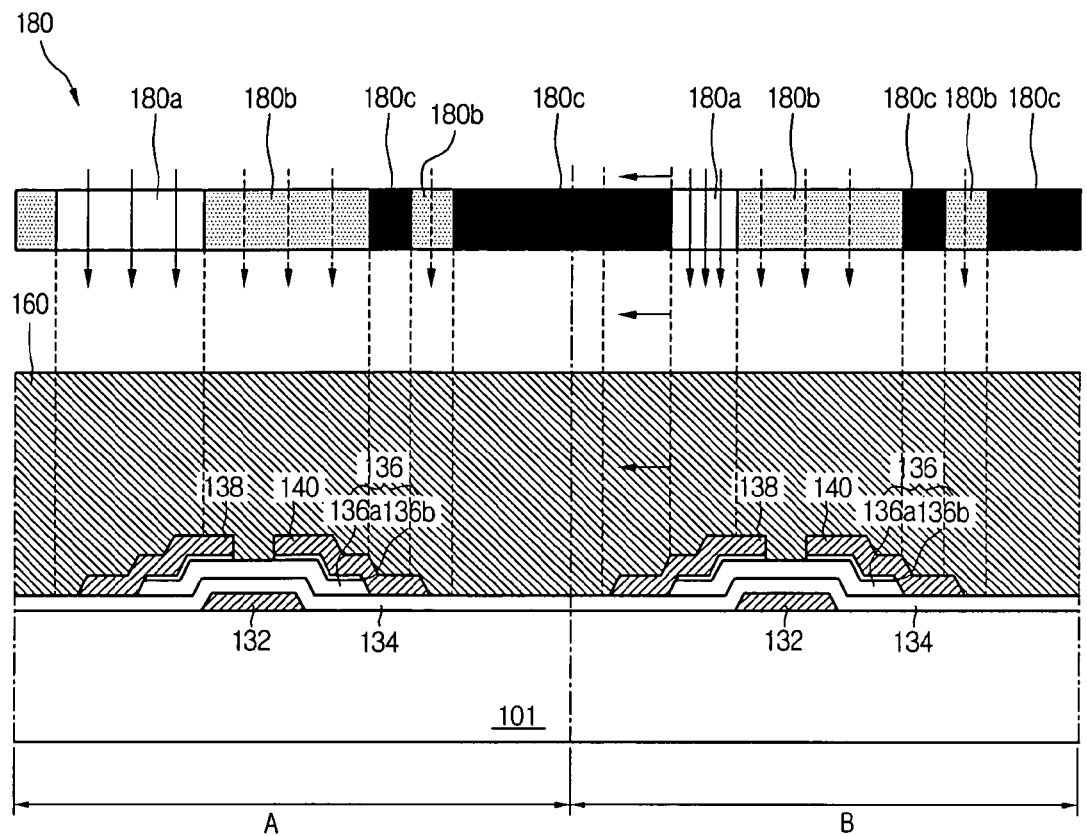

Referring to FIG. 4C, a negative photoresist 160 is formed on the substrate 101 including the source/drain electrodes 138 and 140.

The negative photoresist 160 is a light curable material.

A photo mask 180 is aligned on the negative photoresist 160 and light is irradiated onto the resulting structure.

The photo mask 180 includes a full open region 180a, a half open region 180b, and a closed region 180c. The full open region 180a is formed facing a spacer formation position (for example, a region corresponding to the source electrode 138) to fully transmit light. The half open region 180b is formed facing a passivation layer formation position (for example, a region corresponding to the gate electrode 132) to diffract and transmit light. The closed region 180c is formed facing a drain contact hole formation position (for example, a given region on the drain electrode 140) and pixel electrode formation position (for example, a pixel region) to completely block light.

Figure 4D:
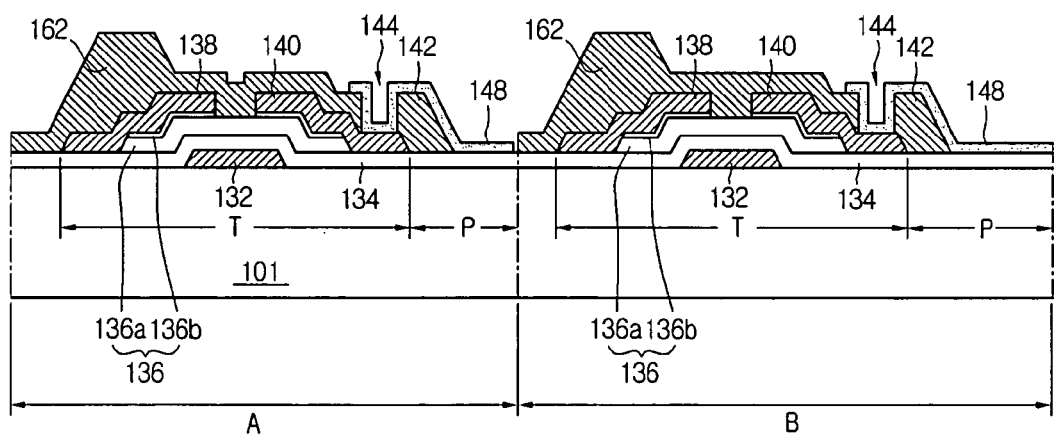

Referring to FIG. 4D, the transmitted light hardens the photoresist 160 facing the full open region 180a of the photo mask 180 to form a spacer 162. Also, the light is diffracted by the half open region 180b of the photo mask 180. The diffracted light half hardens the negative photoresist 160 facing the half open region 180b to form a passivation layer 142. Also, the negative photoresist 160 facing the closed region 180c is removed to form a drain contact hole 144 and expose the gate insulation layer 134 on the pixel region. That is, the negative photoresist 160 on the gate insulation layer 134 is removed because the closed region 180c does not transmit light.

Figure 4E:
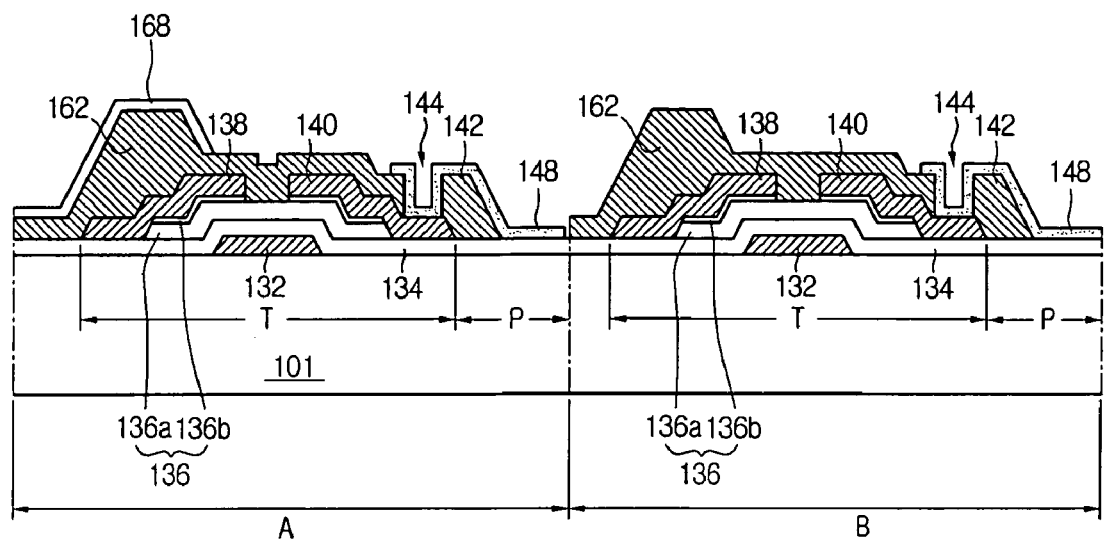

Referring to FIG. 4E, a transparent conductive material is formed on the entire region of the substrate 101 and the resulting structure is patterned to form a pixel electrode 148 and a transparent conductive pattern 168.

The pixel electrode 148 is connected to the drain electrode 140 through the drain contact hole 144, and is formed on the exposed gate insulation layer 134 of the pixel region. The transparent conductive pattern 168 is formed on the spacer 162 formed on a portion of the peripheral pixel A.

Accordingly, the transparent conductive pattern 168 contacts with a common electrode 116 of the color filter substrate 110, and is connected to a common voltage generator (not illustrated) extending to the outside via the bottom surface of a seal pattern 152.

Accordingly, a common voltage from the common voltage generator is applied to the common electrode 116 through the transparent conductive pattern 168 formed on the spacer 162.

The passivation layer 142 and the spacer 162 may be formed of a photosensitive material other than the negative photoresist 160. That is, a positive photoresist may be used instead of the negative photoresist 160.

The positive photoresist is a material that can be dissolved and removed by light. Accordingly, when the positive photoresist is used instead of the negative photoresist 160, the full open region 180a and the closed region 180c must be interchanged with each other. In this case, the half open region 180b may be maintained as it is.

Accordingly, when the photo mask is aligned on the positive photoresist and light is irradiated onto the resulting structure, the positive photoresist facing the closed region is hardened to form the spacer, the positive photoresist facing the half open region is half hardened by diffraction to form the passivation layer, and the positive photoresist facing the full open region is dissolved and removed to form the drain contact hole and expose the gate insulation layer of the pixel region.

Therefore, even when a positive photoresist is used instead of the negative photoresist, the spacer and the passivation can be simultaneously formed in one piece.

As described above, the passivation layer and the spacer are formed in one piece and are simultaneously formed of a photosensitive material using one diffraction mask without using an addition mask process, thereby making it possible to reduce the complexity and cost of the entire manufacturing process and thus enhance the manufacturing yield.

Also, the transparent conductive electrode pattern is formed on the spacer in a portion of the peripheral pixel and is connected to the common electrode, thereby making it possible to electrically connect the upper substrate and the lower substrate without using a separate Ag dotting process.

It will be apparent to those skilled in the art that various modifications and variations can be made in the present invention. Thus, it is intended that the present invention cover the modifications and variations of this invention provided they come within the scope of the appended claims and their equivalents.

What is claimed is:

1. An liquid crystal display device (LCD) comprising:
   first and second substrates facing each other and including a plurality of pixel regions arranged in a matrix;
   a liquid crystal layer interposed between the first and second substrates;

a gate insulating layer formed on the first substrate;
a plurality of TFTs formed on the pixel regions on the first substrate;
a passivation layer formed on the TFTs; and
a pixel electrode connected to each TFT; and
a spacer integrally formed with the passivation layer,
wherein the passivation layer is not formed in the pixel region; and
wherein the pixel electrode is formed to contact the gate insulting layer in the pixel region.

2. The LCD according to claim 1, wherein the spacer is formed on the TFT.

3. The LCD according to claim 1, wherein the spacer is a patterned spacer.

4. The LCD according to claim 1, further comprising a transparent conductive pattern formed on the spacer.

5. The LCD according to claim 4, wherein the transparent conductive pattern is formed in a peripheral region of the first substrate.

6. The LCD according to claim 4, wherein the transparent conductive pattern is electrically connected to a common electrode of the second substrate.

7. The LCD according to claim 4, wherein the transparent conductive pattern is formed of a same material as a pixel electrode electrically connected to the TFT.

8. The LCD according to claim 1, further comprising a pixel electrode formed in each of the pixel regions on the first substrate and connected to the TFT.

9. The LCD according to claim 1, wherein the passivation layer and the spacer are formed of a same material.

10. The LCD according to claim 1, wherein the passivation layer and the spacer are formed of a photosensitive material.

11. The LCD according to claim 10, wherein the photosensitive material is a negative photoresist.

12. The LCD according to claim 10, wherein the photosensitive material is a positive photoresist.

13. A method of manufacturing a liquid crystal display device (LCD), the method comprising:
    forming a gate insulating layer on a first substrate;
    forming a plurality of TFTs in each pixel region on a first substrate where a plurality of the pixel regions arranged in a matrix are defined;
    forming a pixel electrode connected to each TFT;
    simultaneously forming a spacer and a passivation layer on the TFT;
    preparing a second substrate facing the first substrate and including a color filter layer and a common electrode; and
    interposing a liquid crystal layer between the first substrate and the second substrate,
    wherein the passivation layer is not formed in the pixel region; and
    wherein the pixel electrode is formed to contact the gate insulating layer in the pixel region.

14. The method according to claim 13, wherein the simultaneous forming of the space and the passivation layer includes:
    coating a photosensitive material on the first substrate;
    aligning a mask including a full open region, a half open region, and a closed region on the coated photosensitive material; and
    irradiating light on the mask.

15. The method according to claim 14, wherein the half open region diffracts and transmits the light.

16. The method according to claim 14, wherein the photosensitive material is a negative photoresist.

17. The method according to claim 14, wherein the photosensitive material is a positive photoresist.

18. The method according to claim 14, wherein, when the photosensitive material is a negative photoresist, the photosensitive material facing the full open region is hardened to form the spacer, the photosensitive material facing the half open region is half hardened to form the passivation layer, and the photosensitive material facing the closed region is removed.

19. The method according to claim 14, wherein, when the photosensitive material is a positive photoresist, the photosensitive material facing the closed region is hardened to form the spacer, the photosensitive material facing the half open region is half hardened to form the passivation layer, and the photosensitive material facing the full open region is removed.

20. The method according to claim 13, further comprising forming a pixel electrode on the first substrate including the passivation region.

21. The method according to claim 20, wherein a transparent conductive pattern is formed on the spacer and is electrically connected to the common electrode of the second substrate.

22. The method according to claim 20, wherein a transparent conductive pattern is formed in a peripheral region of the first substrate.

* * * * *